US010059204B2

(12) United States Patent
Intini

(10) Patent No.: US 10,059,204 B2
(45) Date of Patent: Aug. 28, 2018

(54) OPERATING DEVICE FOR A MOTOR VEHICLE AND A STEERING WHEEL HAVING AN OPERATING DEVICE

(71) Applicant: VALEO Schalter und Sensoren GmbH, Bietigheim-Bissingen (DE)

(72) Inventor: Onofrio Intini, Vaihingen an der Enz (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 238 days.

(21) Appl. No.: 14/782,403

(22) PCT Filed: Apr. 1, 2014

(86) PCT No.: PCT/EP2014/056506
§ 371 (c)(1),
(2) Date: Oct. 5, 2015

(87) PCT Pub. No.: WO2014/161841
PCT Pub. Date: Oct. 9, 2014

(65) Prior Publication Data
US 2016/0059699 A1 Mar. 3, 2016

(30) Foreign Application Priority Data
Apr. 5, 2013 (DE) .................. 10 2013 005 886

(51) Int. Cl.
*H01H 9/00* (2006.01)
*B60K 35/00* (2006.01)
(Continued)

(52) U.S. Cl.
CPC .............. *B60K 35/00* (2013.01); *B62D 1/046* (2013.01); *G06F 3/0362* (2013.01);
(Continued)

(58) Field of Classification Search
CPC ... B62D 1/046; G06F 3/0362; G06F 3/03548; B60K 2350/102; B60K 2350/2039
(Continued)

(56) References Cited

U.S. PATENT DOCUMENTS 7,790,996 B2 * 9/2010 Swamy .................. H01H 3/022
200/308
7,812,274 B2 * 10/2010 Dupont .................. B60K 26/02
200/316

(Continued)

FOREIGN PATENT DOCUMENTS

CN 202856713 U 4/2013
DE 19840070 A1 3/2000
(Continued)

OTHER PUBLICATIONS

International Search Report issued in corresponding application No. PCT/EP2014/056506 dated Dec. 2, 2014 (3 pages).
(Continued)

*Primary Examiner* — Edwin A. Leon
*Assistant Examiner* — Lheiren Mae A Caroc
(74) *Attorney, Agent, or Firm* — Osha Liang LLP

(57) ABSTRACT

The invention relates to an operating device (1) for a motor vehicle, with at least one operating control (3) which can be actuated by an operator (4), and with a symbol bearer (18), separate from the operating control (3), for the graphical identification of the at least one operating control (3), wherein the symbol bearer (18) for the operating element (3) has a first and at least one further graphical symbol (25) different therefrom and can be moved relative to the at least one operating control (3) between a first position in which the operating control (3) is identified with the first symbol (25a) and at least one further position in which the operating control (3) is identified with the further symbol (25b).

12 Claims, 11 Drawing Sheets

Figure 4:
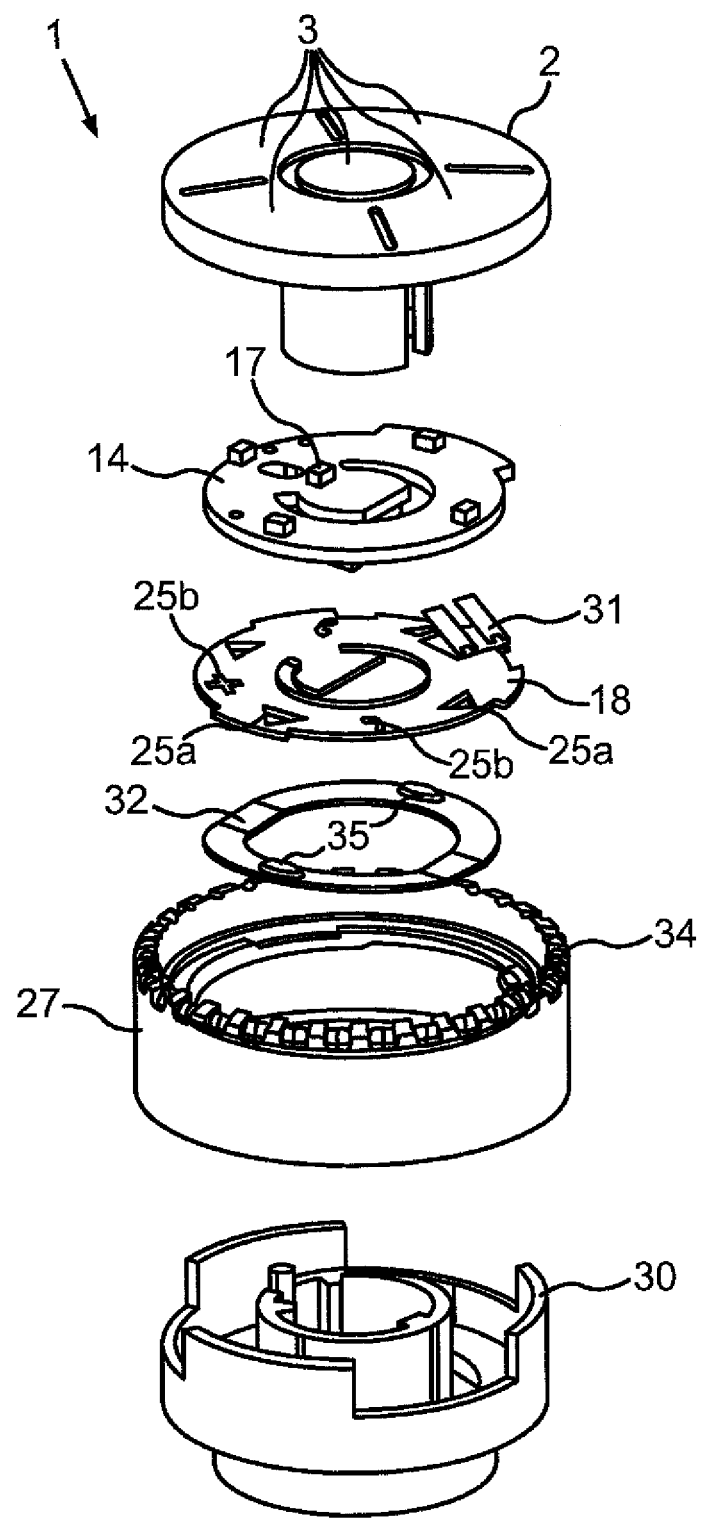

(51) Int. Cl.
*G06F 3/0362* (2013.01)
*G06F 3/0354* (2013.01)
*B62D 1/04* (2006.01)

(52) U.S. Cl.
CPC .... *G06F 3/03548* (2013.01); *B60K 2350/102* (2013.01); *B60K 2350/1036* (2013.01); *B60K 2350/2039* (2013.01)

(58) Field of Classification Search
USPC .................................................. 200/308–317
See application file for complete search history.

(56) References Cited

U.S. PATENT DOCUMENTS

| | | | |
|---|---|---|---|
| 2002/0030668 A1 | 3/2002 | Hoshino et al. | |
| 2005/0098417 A1* | 5/2005 | Miyako | B60K 35/00 200/61.54 |
| 2005/0134116 A1* | 6/2005 | Hein | B60K 37/06 307/10.1 |
| 2007/0136694 A1 | 6/2007 | Friedman et al. | |
| 2009/0189790 A1 | 7/2009 | Peterson et al. | |

FOREIGN PATENT DOCUMENTS

| | | |
|---|---|---|
| DE | 102007006506 A1 | 8/2008 |
| DE | 102010012240 A1 | 9/2011 |
| EP | 1555684 A1 | 7/2005 |
| EP | 2306273 A1 | 4/2011 |
| GB | 2494420 A | 3/2013 |
| JP | S53140079 U | 11/1978 |
| JP | S54-83913 U | 6/1979 |
| JP | 2012-230884 A | 11/2012 |

OTHER PUBLICATIONS

Notification of Reasons for Refusal issued in corresponding Japanese Patent Application No. 2016-505795, dated Jan. 9, 2018 (7 pages).

* cited by examiner

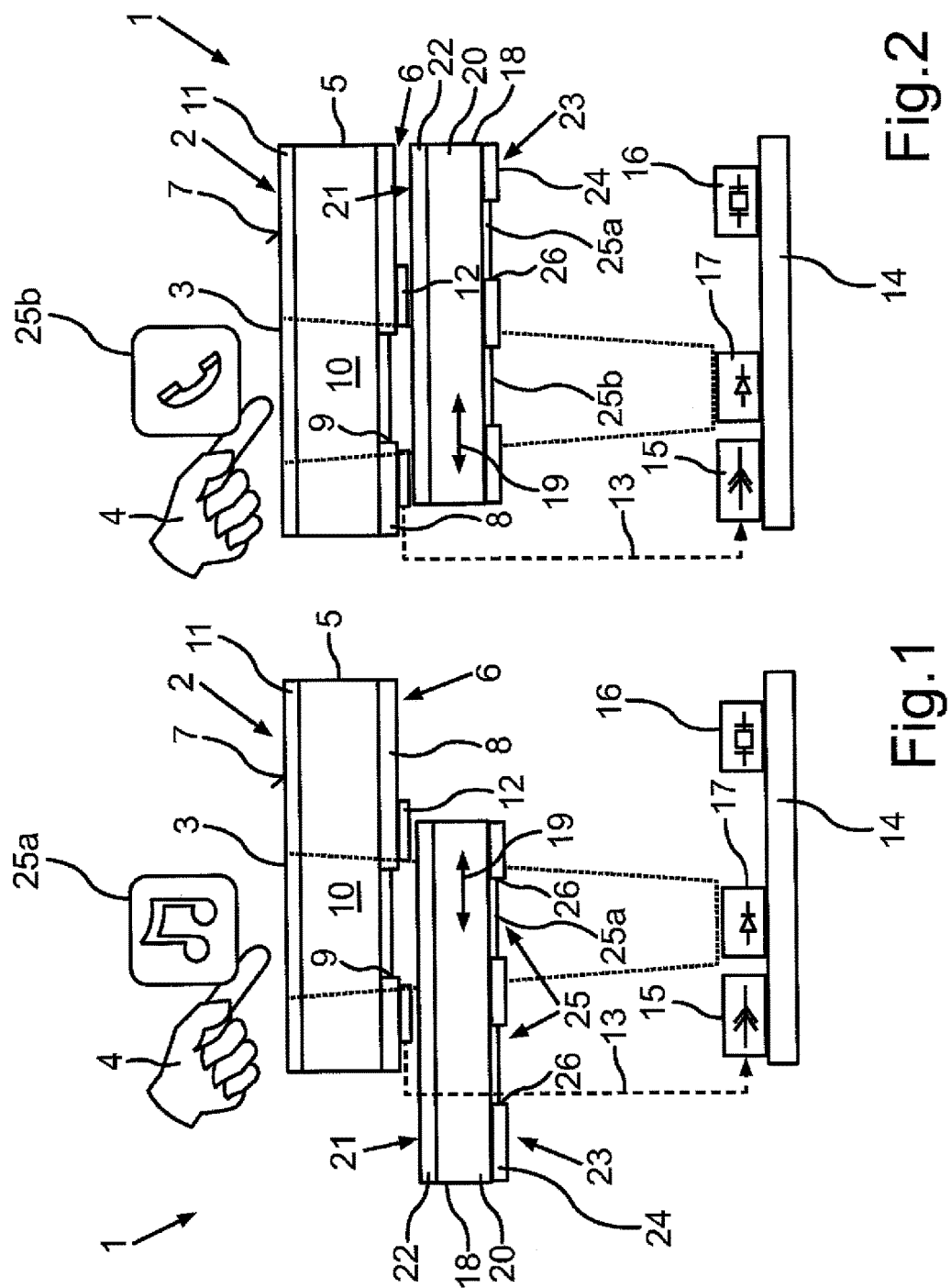

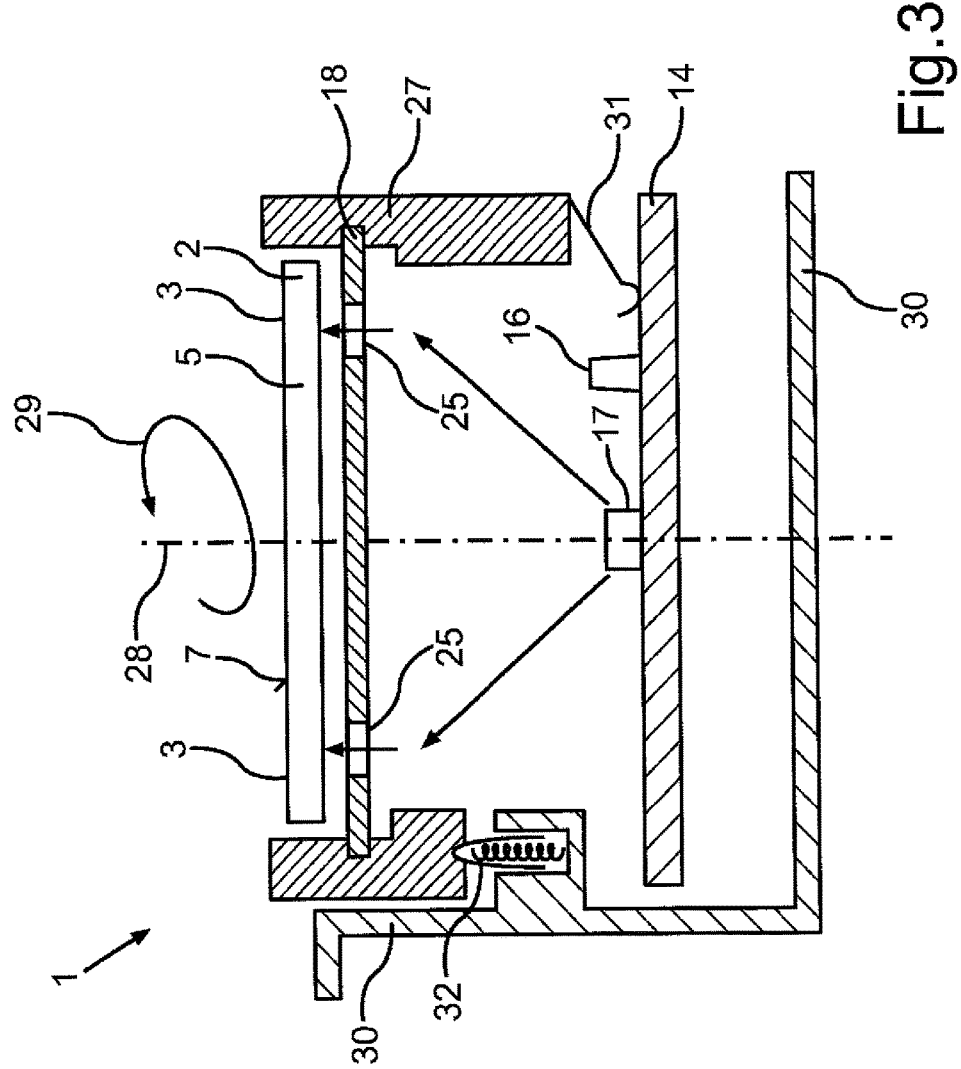

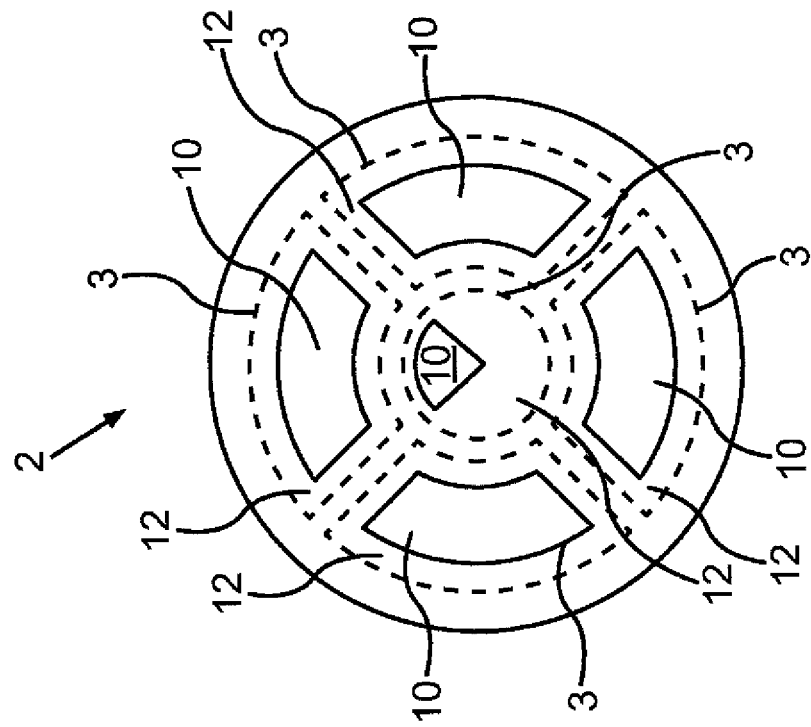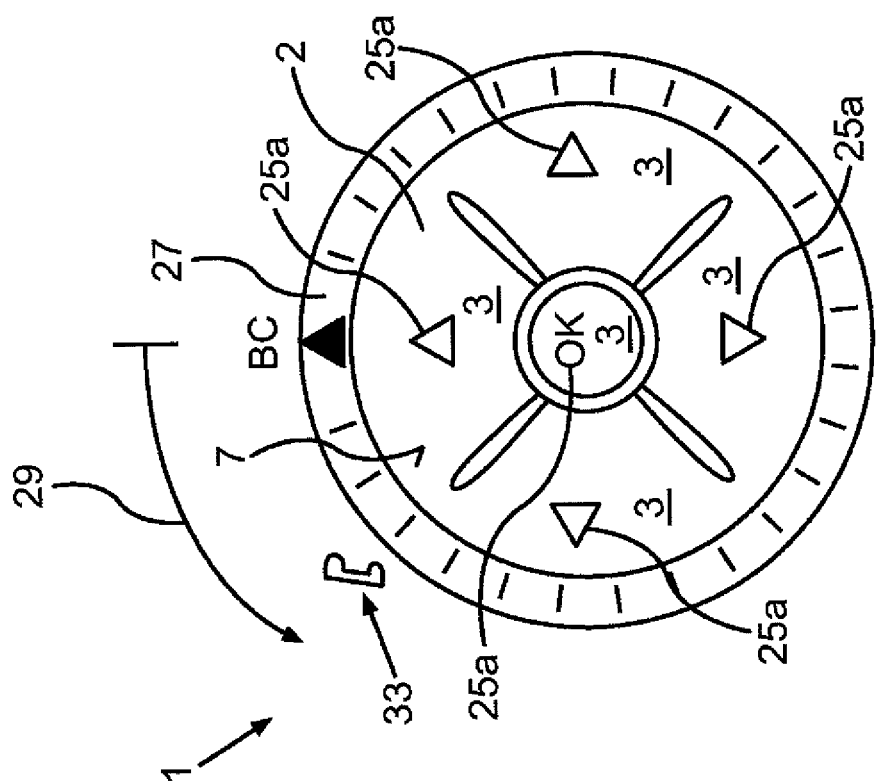

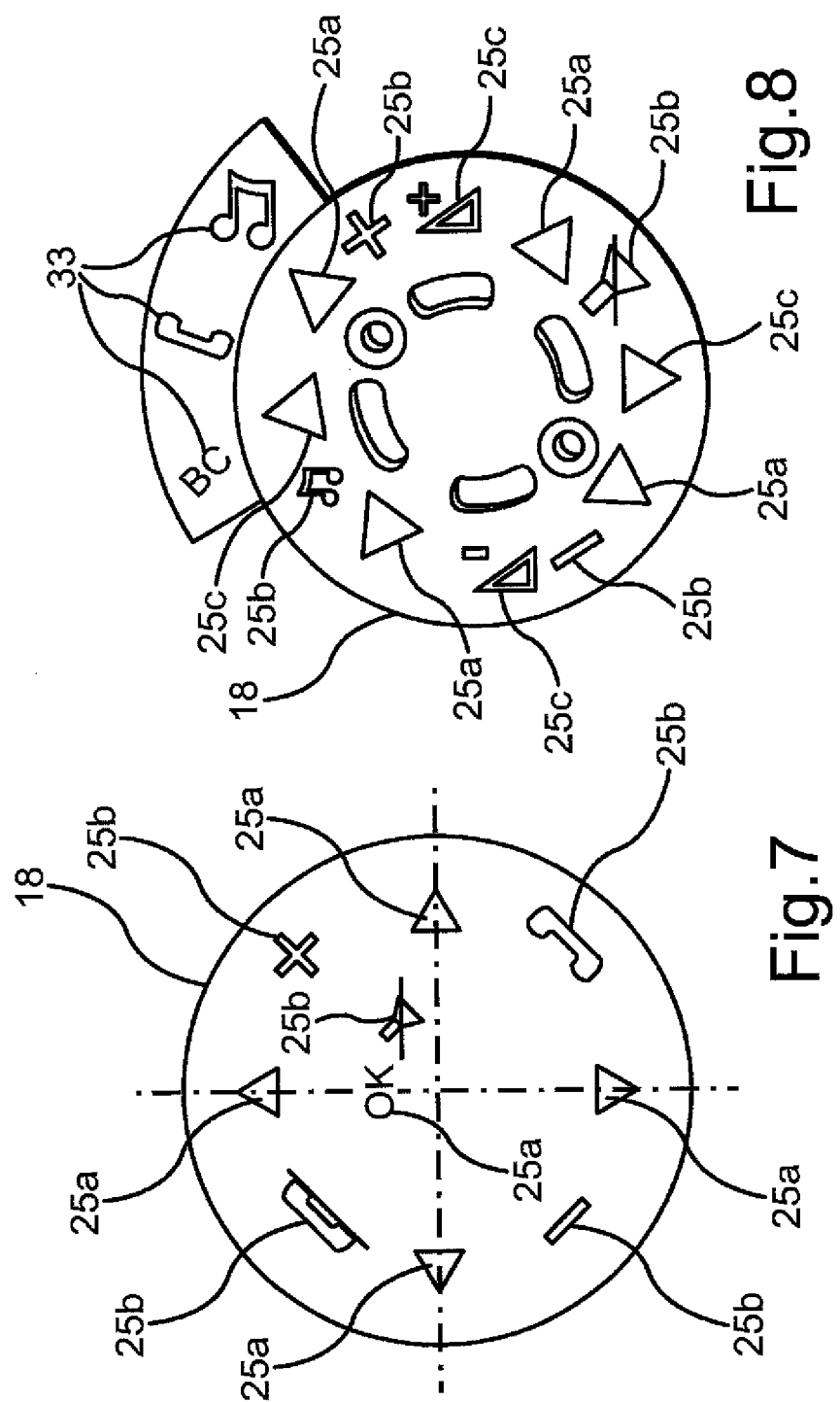

OPERATING DEVICE FOR A MOTOR VEHICLE AND A STEERING WHEEL HAVING AN OPERATING DEVICE

The invention relates to an operating device for a motor vehicle, with at least one operating control which can be actuated by an operator, and with a symbol bearer separate from the operating control for the graphic identification of the at least one operating control. The invention also relates to a vehicle steering wheel, particularly for a passenger car, with such an operating device.

The interest is directed in the present case preferably to an operating device which is designed especially for installation on a steering wheel of a motor vehicle. Such operating devices are already known in varied embodiments from the prior art. In this context, it is already known, for example, to mount mechanical push-button switches or rotary switches on a steering wheel by means of which, for example, the on-board computer of the motor vehicle, a telephone system, an audio system and other functional devices of the motor vehicle can be operated. In the prior art, however, a certain compromise must be made between the clarity of the operating controls, on the one hand, and the number of functional devices to be operated in the motor vehicle, on the other hand. With a multiplicity of operating controls, the driver will rapidly lose track and can thus be distracted relatively simply from the current road situation. In the case of some operating devices, which are arranged in a relatively complex manner, the driver must even take his hands from the steering wheel for operating the various operating controls. If, on the other hand, the number of operating controls were to be reduced in the prior art, the number of functional devices would be reduced which can be controlled by means of the operating controls mounted on the steering wheel. In this case, the driver will possibly have to operate operating controls which are mounted on a centre console. This, too, leads to a distraction of the driver. A particular challenge thus consists in ensuring that the driver, by means of the operating device, can operate a multiplicity of various functions and the operating device itself is designed in a very clear and user-friendly manner so that it does not lead to any distraction from the current road situation.

It is the object of the invention to demonstrate a solution as to how it can be made possible with an operating device of the type initially mentioned that, by means of the at least one operating control as many different functions as possible be executed without the operating device itself being arranged confusingly.

According to the invention, this object is achieved by means of an operating device and a steering wheel having the features according to the respective independent patent claims.

Advantageous embodiments of the invention are the subject matter of the dependent claims, the description and the figures.

An operating device according to the invention is constructed especially for installation in a motor vehicle, for example on a steering wheel, and comprises at least one operating control and a symbol bearer, separate from the operating control, for the graphic identification of the at least one operating control. The symbol bearer for the operating control has a first and at least one further graphical symbol different therefrom and can be moved between a first position and at least one further position relative to the operating control and thus independently of the operating control and especially independently of an operation of the operating control. Whereas in the first position, the operating control is identified with the first symbol, the operating control is identified with the further symbol in the further position of the symbol bearer.

According to the invention, it is thus proposed to provide, at an operating device having at least one operating control, a variable identification of this operating control. Depending on the position of the symbol bearer, different operating functions can thus be assigned to the operating control by this means. In this manner, an operating device can be created by means of which, on the one hand, a multiplicity of various operating functions and thus also a multiplicity of different functional devices of the motor vehicle can be operated which, on the other hand, is designed in a very clear and user-friendly manner and provides for a particularly intuitive operation. In turn, the result of this is that the driver, when operating the operating device, is not distracted from the current road situation and can continue to concentrate on the current traffic situation. In this way, the number of operating controls can be reduced to a minimum without a compromise having to be made with respect to the number of functional devices of the motor vehicle to be controlled.

The symbol bearer for the operating control thus has a first and at least one further graphical symbol. In the present text, a graphical symbol is generally understood to be a character, i.e. an identification of the operating function assigned to the operating control. In this context, a character can be a logogram, a single letter, a pictogram and/or a logo-pictogram.

For example, the operating device can also have a multiplicity of operating controls which can be actuated by the operator and the symbol bearer can have in each case a first symbol and at least one further symbol different therefrom for each operating control. The operating controls are identified with the respective first symbol in the first position of the symbol bearer; the operating controls are identified with the respective further symbol in the further position. For example, two or three or four or five or six operating controls can be provided to which in each case at least two mutually different graphical symbols are allocated. If the symbol bearer is moved from the first position to the further position, the identification of all operating controls preferably changes simultaneously from the respective first symbol to the respective further symbol. For example, this can appear in such a way that in the first position of the symbol bearer, a first functional device is controlled by means of the operating controls whereas in the further position another functional device is controlled. Thus, it is possible to change, from an on-board computer to a radio or to an audio system or also to a telephone system. By means of only a few operating controls, the most varied functional devices of the motor vehicle can thus be controlled.

In one embodiment, it is provided that the at least one operating control is arranged in mutual overlap with the symbol bearer and has a transparent window through which the respective current symbol can be viewed. This means, in particular, that the symbol bearer—when observed by the user—is arranged to be hidden or covered behind the at least one operating control and only the current symbol can be viewed through the window. In this manner, a clear operating device can be created in which the operating control is always designated reliably and very perceptibly. In addition, a particularly attractive appearance of the operating device is thus created which can also be furthermore improved in that the said window can easily be coloured—for example grey—which ensures that the symbol is only displayed to be visible if it is additionally also illuminated, particularly backlit.

The graphical symbols are preferably formed by respective recesses in printing—for example by means of screen printing—on the symbol bearer. In this context, the operating device can have a luminous unit, by means of which the graphical symbols can be backlit. By this means, an optically attractive elegant appearance of the operating device can also be provided for. In addition, it can thus also be ensured that the symbols are displayed visibly exclusively when they are backlit by means of the luminous unit. The symbol bearer can comprise a transparent plate or disc or a transparent foil which is negatively printed on the rear side so that the graphical symbols are formed by this negative printing and thus by the recesses in the black printing. The disc or foil can then be coloured transparently and optionally also lightly—for example grey. On the one hand, this provides for reliable and effective illumination of the symbols but, on the other hand, it is prevented that the luminous unit itself can be seen or perceived through the transparent window.

With regard to the movement of the symbol bearer between the first position and the at least one further position, various embodiments can be provided:

On the one hand, it can be provided that the symbol bearer is rotatably mounted between the first and the at least one further position. In this manner, a particularly space-saving operating device can be created in which the symbol bearer requires particularly little construction space. Specifically, this can be provided, for example, in the form of a circular disc which is mounted rotatably around an axis of rotation extending through the centre of the disc.

Alternatively, however, it can also be provided that the symbol bearer is mounted displaceably between the first and the at least one further position, particularly translatorally and thus displaceably in a straight line. This embodiment, in turn, is found to be advantageous, for example, if a large number of symbols which cannot be implemented in the case of a rotatable symbol bearer are provided for each operating control.

It is found to be particularly advantageous if the operating device has an actuating element which can be actuated by the operator and is separate from the operating controls, by means of which the symbol bearer is moved between the first position and the at least one further position. The operator can thus decide himself into which position the symbol bearer is to be moved so that the selection of the symbols and thus particularly also the selection of the assigned operating functions is carried out by the operator himself. This creates a particularly user-friendly operating device.

With regard to the transfer of the movement of the actuating element to the symbol bearer, various embodiments can be provided: on the one hand, the actuating element can firstly be mounted to be rotatable. On the other hand, it can also be provided as an alternative that the actuating element is mounted displaceably, particularly displaceably in a straight line. A rotational movement of the actuating element can be converted either into an equally rotational movement or into a translational movement of the symbol bearer. A sliding movement of the actuating element can also result either in a rotational or a translational movement of the symbol bearer. The transmission of force from the actuating element to the symbol bearer can also be performed directly—i.e. without intermediate elements—or via a corresponding transmission.

If the actuating element is mounted rotatably, the axis of rotation can be oriented differently. On the one hand, it can be provided that the actuating element is mounted rotatably around an axis of rotation which is oriented perpendicularly to an operating interface of the operating device. On the other hand, the actuating element can be mounted alternatively to be rotatable around an axis of rotation which extends essentially parallel with the operating interface. In this context, operating interface is understood to be an external surface, facing the user, of the at least one operating control.

The operating device preferably comprises an electronic control unit which is designed to detect the current position of the symbol bearer. This detection can be performed, for example, in such a manner that a moving electrical contact element which is connected to the symbol bearer is carried to slide over conductor tracks on a stationary circuit board which are electrically coupled to the control unit. The control unit thus detects the in each case current position of the symbol bearer by correspondingly evaluating the signals provided at the conductor tracks.

The control unit can be designed to assign to the at least one operating control an operating function in dependence on the current position of the symbol bearer. The operating function of the operating control, which can be carried out at the current time, thus depends on the current position of the symbol bearer and thus also on the current identification of the operating control. Thus, a multiplicity of different operating functions can be implemented by means of one operating control.

Furthermore, it can be provided that the control unit can drive at least two mutually different functional devices of the motor vehicle by outputting corresponding control signals and the functional device to be driven is selected or specified in dependence on the current position of the symbol bearer. In the first position of the symbol bearer, an on-board computer can be controlled by means of the at least one operating control, for example. In a further position, in turn, e.g. an audio system can be controlled. In yet a further position of the symbol bearer and thus with an even further identification of the at least one operating control, a telephone system can be controlled, for example. Further positions can be allocated, e.g., to a speed control system (Tempomat) and/or a heater and/or a navigation system. In this manner, a multiplicity of different functional devices of the motor vehicle can be operated with only a few operating controls.

In addition to the graphical symbols which identify the current operating function of the at least one operating control, the symbol bearer can also have in each case a graphical function symbol for each position which is used for identifying the selected functional device. Thus, the operator is informed about which device can be currently controlled by means of the operating device.

In one embodiment, it is provided that the at least one operating control is formed by a touch-sensitive switching area of a touchpad. In this context, a capacitive sensor can be used, for example, by means of which the touching of the operating control can be detected capacitively. The touchpad can have a transparent disc or plate or a transparent foil, which is provided on the rear side—similar to the symbol bearer—with black printing which has for each operating control a recess by means of which said window is implemented. As already stated, this transparent plate or foil can be designed to be slightly coloured so that the symbols are only perceived when they are illuminated or backlit by means of the luminous unit. The capacitive sensor can be arranged on the rear side of the plate/foil around the window. If a number of operating controls are used, they can be implemented by means of a common or single foil/plate which is provided on its rear side with a number of capacitive sensors. For each operating control, an associated window is then preferably also provided in each case through which the current symbol can be viewed.

The said foil/plate can be constructed, in particular, as a back injection moulded decorative foil, for example with a high gloss depth effect, as a matt foil, a brushed aluminium foil or the like.

However, the invention is not restricted to the embodiment of the operating control as a touch-sensitive switch. As an alternative, the at least one operating control can also be constructed as a mechanical switch, for example as a pushbutton or the like.

Particularly preferably, the operating device is designed for installation in and/or on a steering wheel of the motor vehicle.

The invention also relates to a steering wheel for a motor vehicle comprising an operating device according to the invention.

At the steering wheel, it can be provided that the at least one operating control is arranged at a front side of the steering wheel, particularly at a steering wheel spoke.

If, as already stated, the operating device has an actuating element which can be actuated by the operator, by means of which the symbol bearer can be moved between the first position and the at least one further position, two alternative embodiments can be provided:

On the one hand, this actuating element can be arranged at a rear side of the steering wheel opposite the front side. In this embodiment, the entire operating device extends through the steering wheel—particularly through a spoke—so that the actuating element can be operated with the index finger or the middle finger. The at least one operating element is preferably operated by means of the thumb, in turn.

On the other hand, however, it can also be provided that the actuating element, together with the at least one operating control, is arranged at the front side of the steering wheel, particularly at the steering wheel spoke. In this case, the actuating element and the at least one operating control are operated with the thumb.

A method according to the invention is used for operating an operating device of a motor vehicle in which at least one operating control is operated by an operator and the operating control is graphically identified by means of a symbol bearer. The symbol bearer carries one first and at least one further graphical symbol for the operating control and is moved between a first position, in which the operating control is identified with the first symbol, and at least one further position, in which the operating control is identified with the further symbol.

The preferred embodiments presented with respect to the operating device according to the invention, and its advantages correspondingly apply to the steering wheel according to the invention and to the method according to the invention.

Further features of the invention are obtained from the claims, the figures and the figure description. All features and feature combinations mention above in the description and the features and feature combinations mentioned subsequently in the figure description and/or shown in the figures alone can be applied not only in the combination specified in each case but also in other combinations or by themselves.

Figure 9:
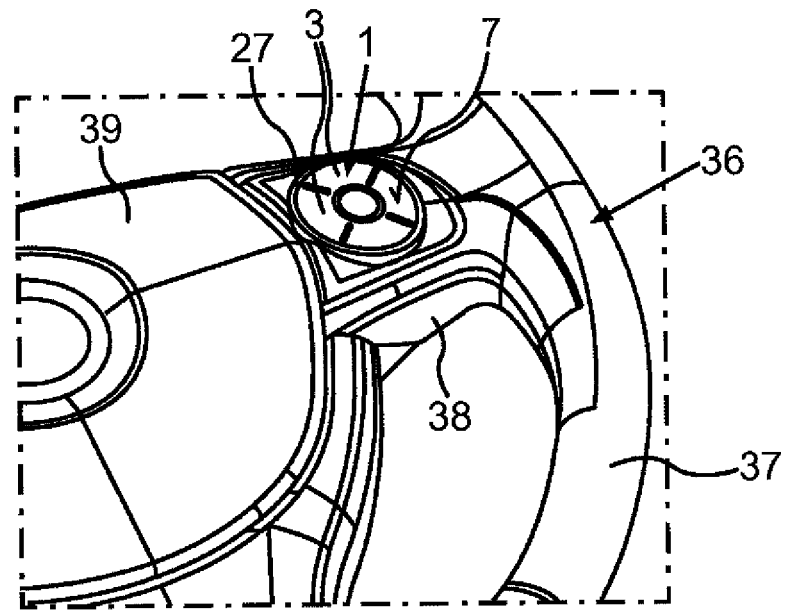
Figure 10:
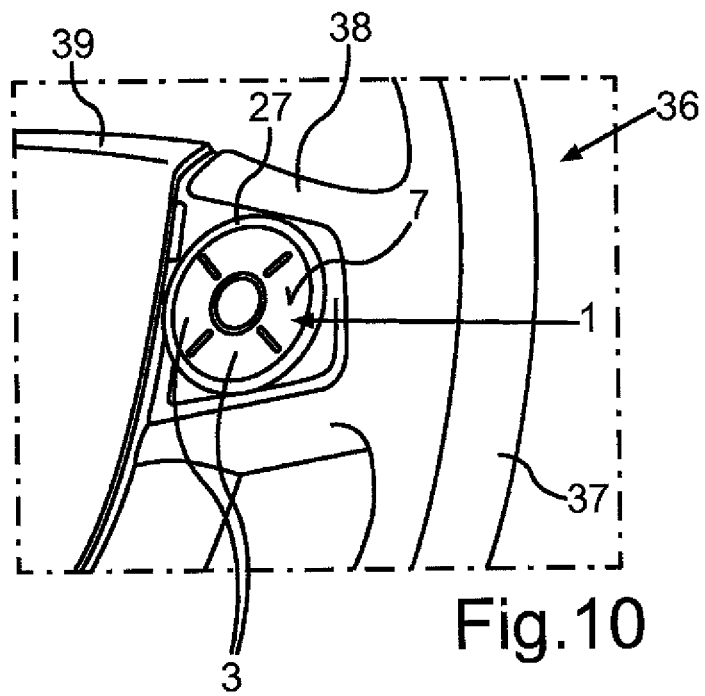
Figure 11:
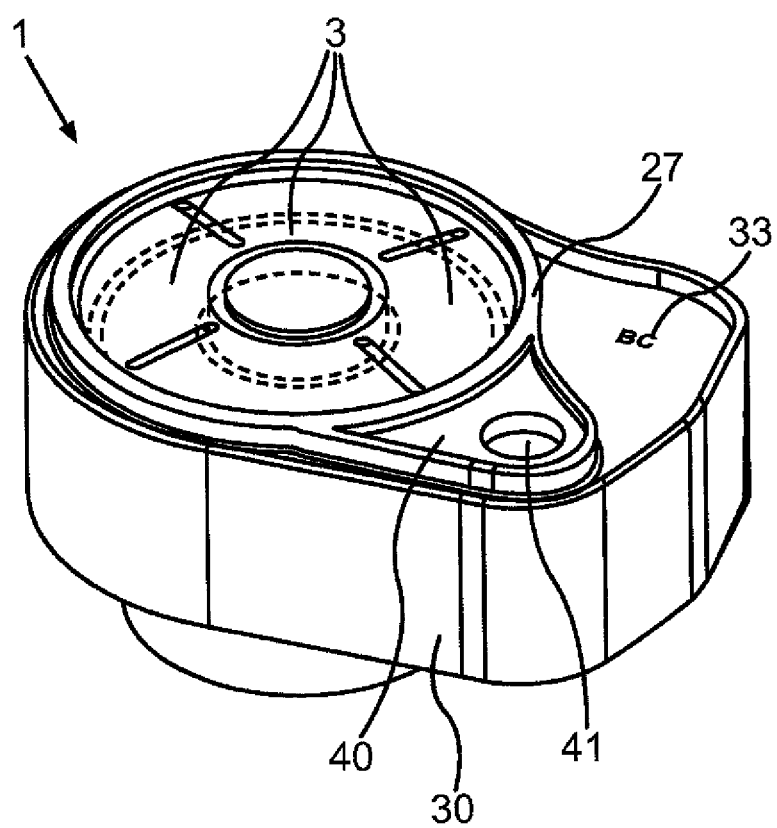
Figure 12:
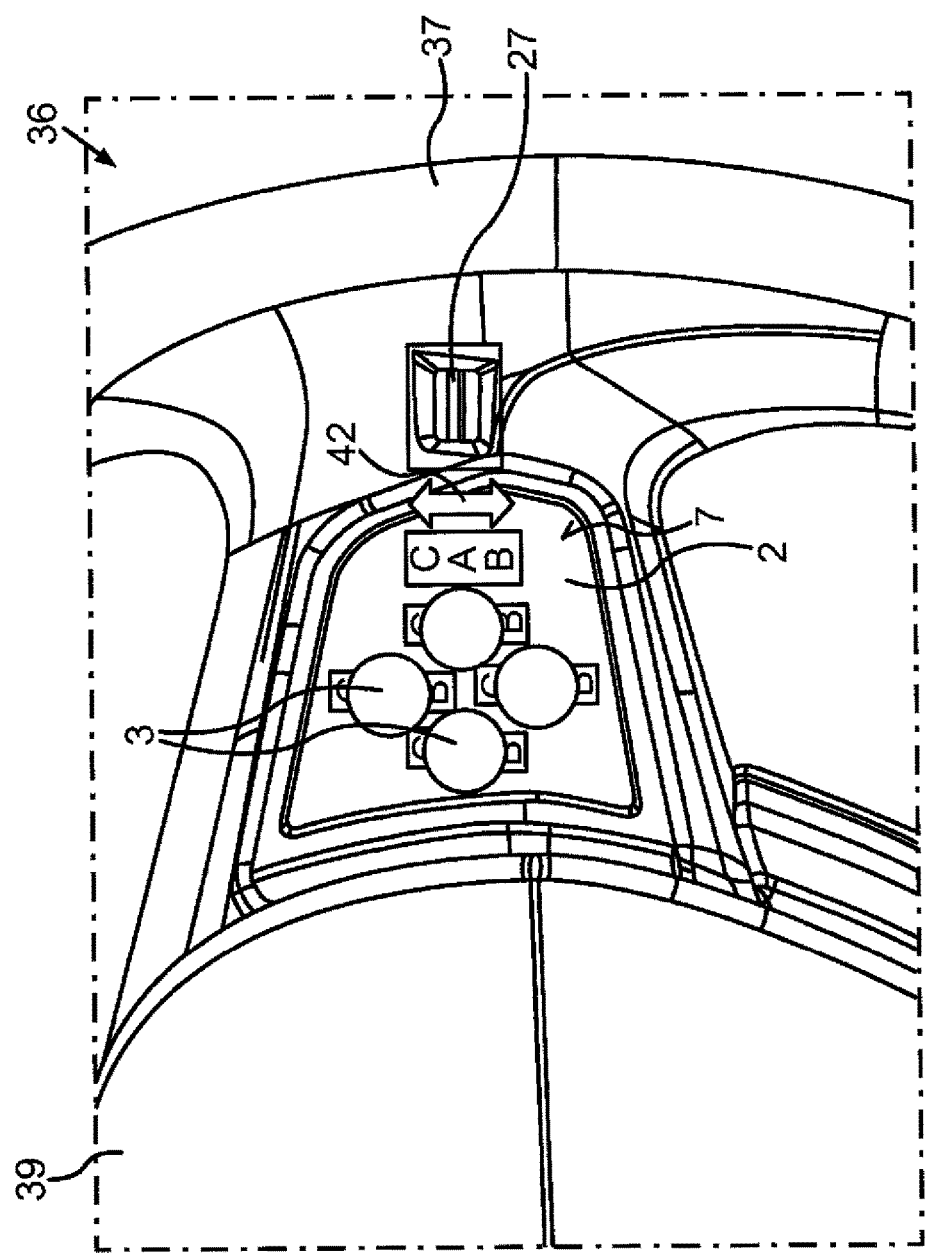
Figure 13:
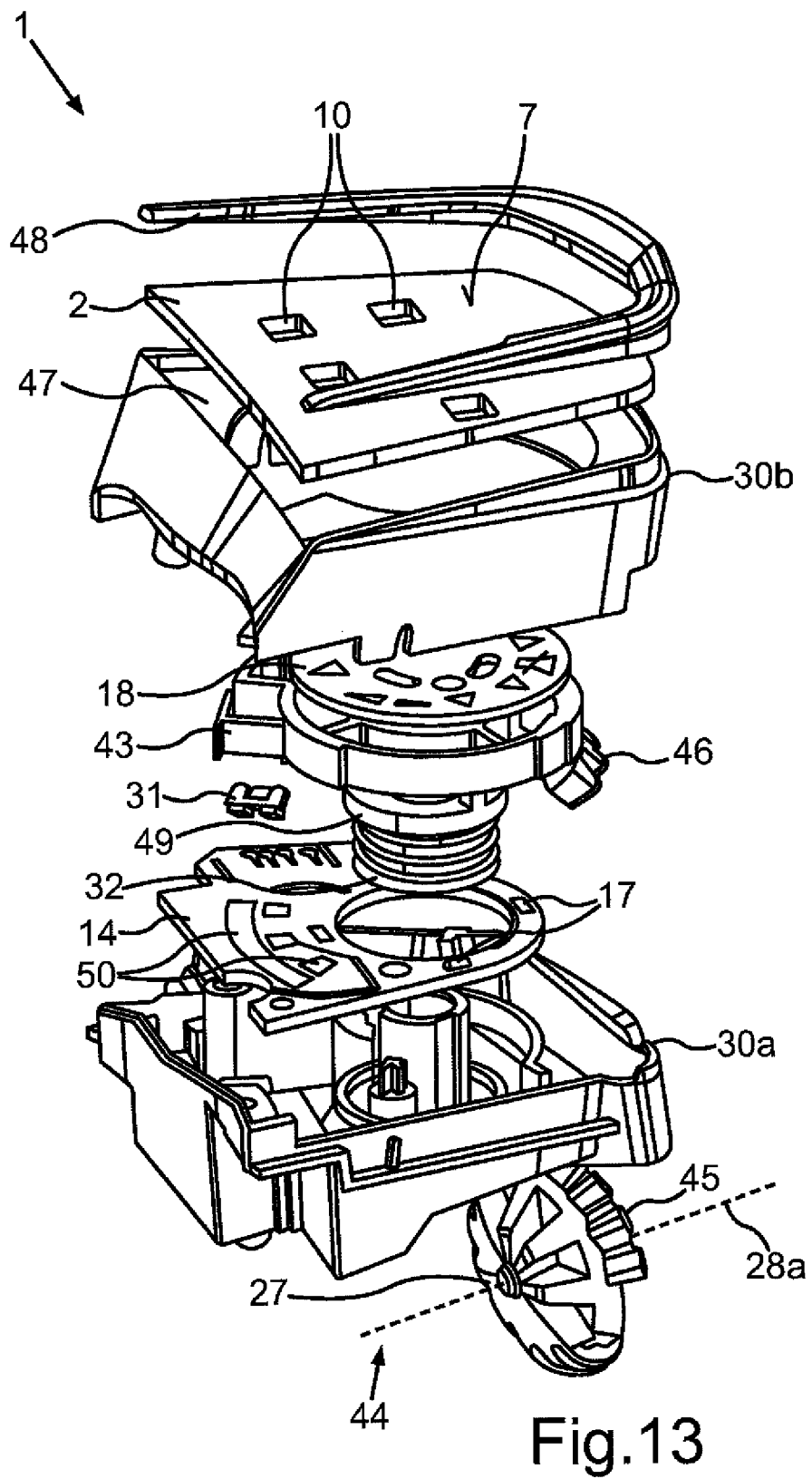
Figure 14:
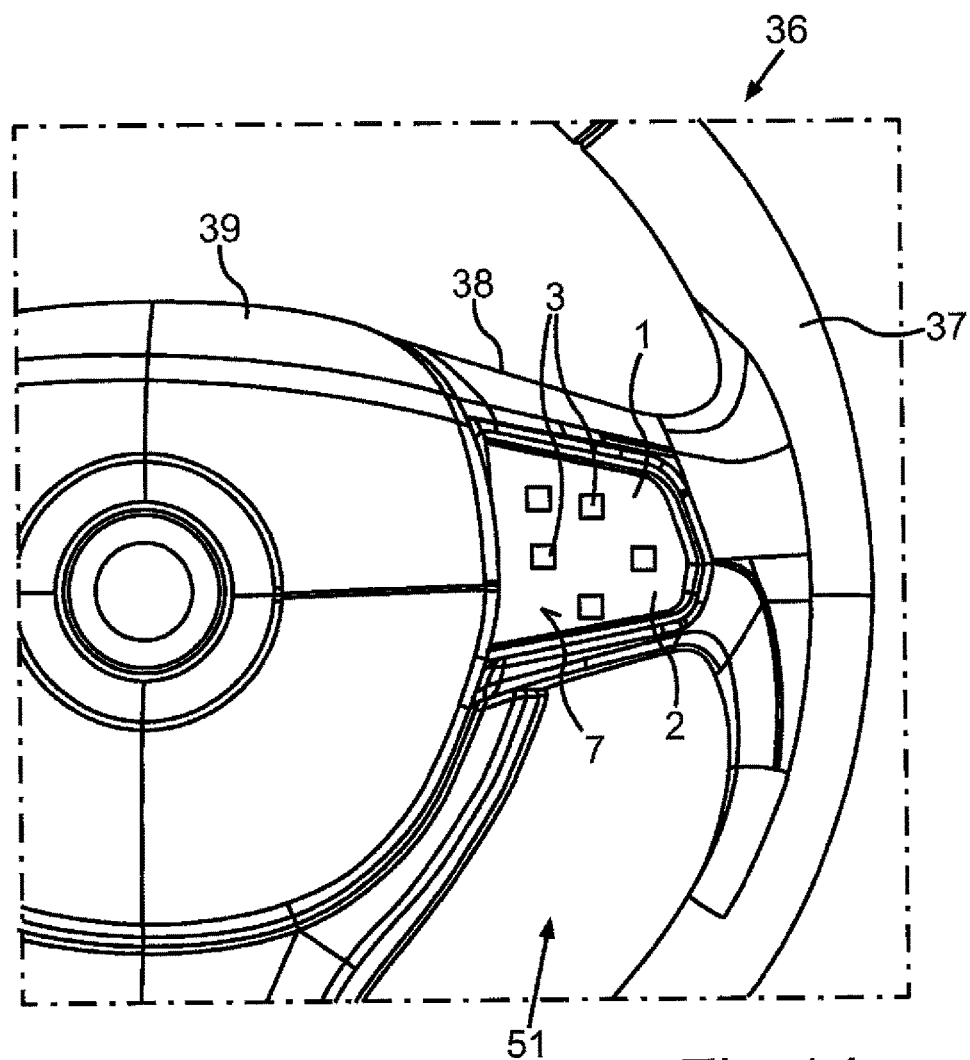
Figure 15:
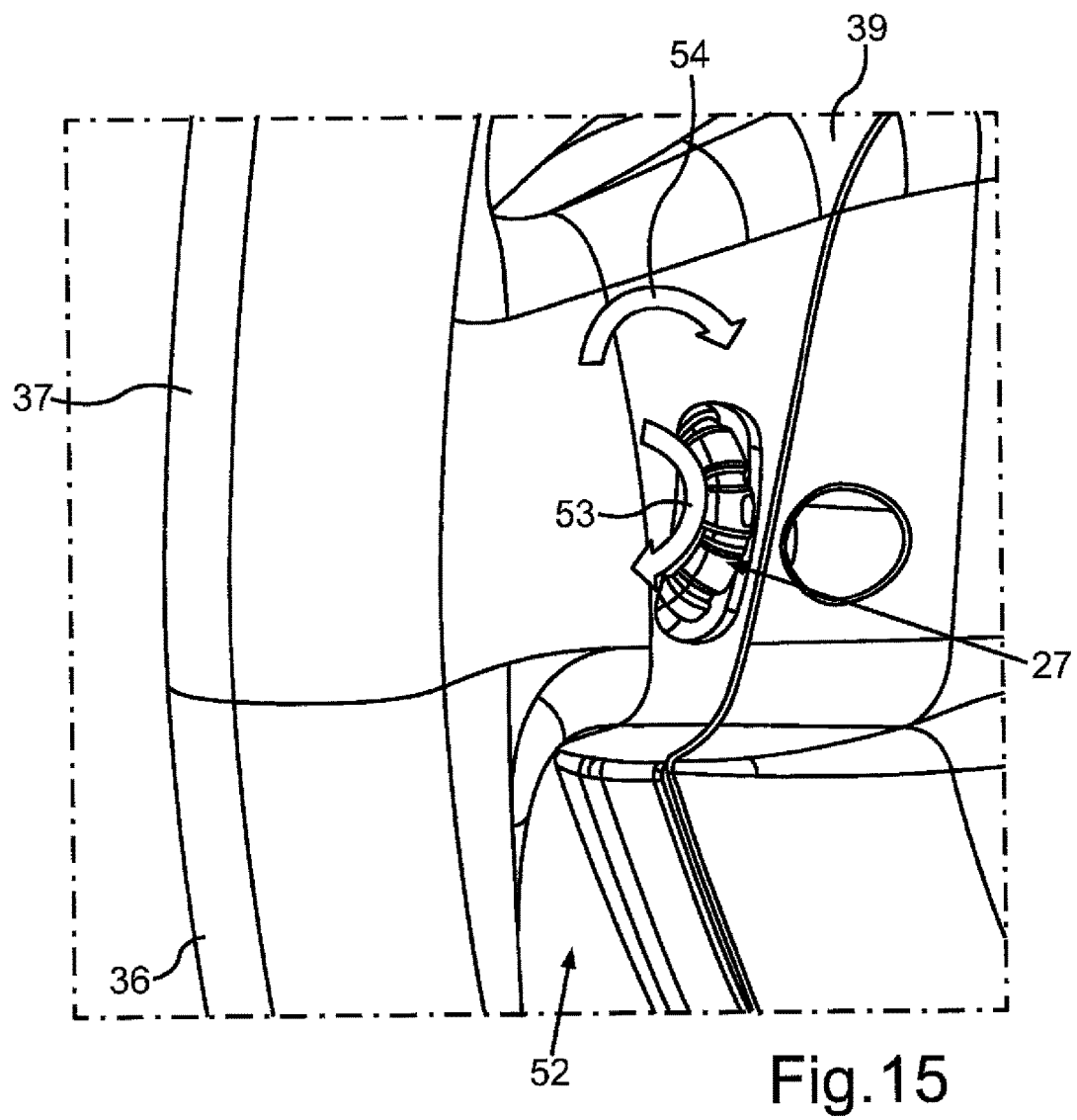

The invention will now be explained by means of the individual preferred illustrative embodiments and with reference to the attached drawings, in which:

FIGS. 1 and 2 diagrammatically show an operating device according to one embodiment of the invention, the general principle of the operating device being explained in greater detail;

FIG. 3 diagrammatically shows a sectional view through an operating device according to one embodiment of the invention;

FIG. 4 diagrammatically shows an exploded view of the operating device according to one embodiment of the invention;

FIG. 5 diagrammatically shows a top view of the operating device;

FIG. 6 diagrammatically shows a top view of a touchpad with operating controls;

FIGS. 7 and 8 diagrammatically show different examples of a symbol bearer;

FIGS. 9 and 10 show a diagrammatic and perspective view of a steering wheel according to one embodiment of the invention;

FIG. 11 diagrammatically shows an operating device according to a further embodiment;

FIG. 12 diagrammatically shows a steering wheel with an operating device according to another embodiment;

FIG. 13 diagrammatically shows an exploded view of an operating device according to a further embodiment;

FIG. 14 diagrammatically shows a front side of a steering wheel with the operating device according to FIG. 13; and FIG. 15 diagrammatically shows the rear side of the steering wheel according FIG. 14.

FIG. 1 diagrammatically shows a principle of an operating device 1 according to one embodiment of the invention. The operating device 1 is designed for integration in a steering wheel of a motor vehicle, in particular a passenger car. The operating device 1 comprises a touch-sensitive touchpad 2 with at least one operating control 3 which can be operated by an operator 4. In the illustrative embodiment, the operating control 3 is designed as the touch-sensitive area of the touchpad 2. The touchpad 2 comprises a transparent foil 5 having a thickness of 0.2 mm to 1 mm. The transparent foil 5 is provided at its rear side 6, and thus is provided, at a side facing away from an operating interface 7, with black printing 8 which is opaque. The printing 8 can be implemented, for example, in a screen printing method.

In the printing 8, a recess 9 is formed for the operating control 3 by which recess 9 a transparent, and thus translucent, window 10 is formed.

The foil 5 is also provided with a layer of paint 11 on its front side. The outer surface of the layer of paint 11 forms the operating interface 7.

On the rear side 6 of the touchpad 2 a capacitive sensor 12 is also arranged around the recess 9, by means of which sensor touching the operating control 3 on its operating interface 7 can be detected. The touching is thus detected capacitively. The sensor 12 is linked electrically by a connecting element 15 to a circuit board 14 via an electrical line 13. On the circuit board 14, a control unit 16 is arranged which can detect the actuation of the operating control 3. Furthermore, a luminous unit 17 is arranged on the circuit board 14, for example in the form of one or more LEDs.

Both the touchpad 2 and the circuit board 14 represents stationary elements. Relative to the touchpad 2 and also to the circuit board 14, a symbol bearer 18 is movably arranged which is movably mounted between a first position shown in FIG. 1 and a further position shown in FIG. 2, according to the arrow representation 19. The symbol bearer 18 is also formed by a transparent foil 20 having a thickness of 0.2 mm to 1 mm which is provided at a front side 21, facing the touchpad 2, with a layer of paint 22 and on a rear side 23, facing the circuit board 14, with black printing 24. In the illustrative embodiment according to FIG. 1, the symbol bearer 18 has two graphical symbols 25 which are formed by recesses 26 in the black printing 24.

In this context, the symbol bearer 20 is arranged in a sandwich type of construction between the touchpad 2, on the one hand, and the circuit board 14, on the other hand, and thus with mutual overlap with and in parallel with the touchpad 2. In the first position shown in FIG. 1, a symbol 25a is located directly below the window 10 of the operating control 3. In the further position shown in FIG. 2, in turn, a second symbol 25b of the symbol bearer 20 is arranged directly below the window 10. Whilst in the first position, the first symbol 25a can thus be viewed through window 10, the second symbol 25b can be perceived by the operator 4 in the further position. The two symbols 25a, 25b are also indicated diagrammatically in FIGS. 1 and 2 above the operating device 1.

Both the foil 5 and the foil 20 can be designed to be slightly coloured so that they have, for example, grey colouring. This ensures, on the one hand, that the symbol 25 is not visible when a luminous unit 17 is switched off. On the other hand, this also achieves that with a luminous unit 17 switched on, only the current symbol 25 but not the luminous unit 17 itself is visible.

It is also provided that the current position of the symbol bearer 18 can be detected by the control unit 16 and an operating function is assigned to the operating control 3 in dependence on the current position. In this context, the symbol bearer 18 can be moved by the operator 4 himself.

FIG. 3 shows a sectional view through an operating device 1 according to one embodiment. The symbol bearer 18 is connected in a rotationally fixed manner to an actuating element 27 which is designed to be annular and completely circumferentially surrounds or encloses the touchpad 2 with the operating controls 3. The actuating element 27, together with the symbol bearer 18, is mounted rotatably around an axis of rotation 28 extending perpendicularly to the operating interface 7 according to the arrow representation 29 on a stationary housing 30. To detect the current rotational position of the actuating element 27 or of the symbol bearer 18, respectively, an electrical contact element 31 is provided which is rotationally rigidly connected to the actuating element 27 and thus indirectly to the symbol bearer 18 and slides over conductor tracks which are provided on the circuit board 14. These conductor tracks are electrically coupled with the control unit 16 which detects the current position of the actuating element 27.

With the aid of an elastically constructed latching facility 32, a haptic return message is generated when operating the actuating element 27 in that the latching facility 32 latches into a corresponding latching structure which is formed on the actuating element 27.

The annular actuating element 27 is designed in such a manner that it protrudes slightly over the operating interface 7 in the direction along the axis of rotation 28 towards the outside. Thus, the operator 4 can feel and actuate the actuating element 27 without much effort.

In the illustrative embodiment according to FIG. 3, the touchpad 2 or the foil 5, respectively, is designed in the form of a circular disc and has a number of operating controls 3 which are arranged distributed in the direction of the circumference. It should be mentioned that the luminous unit 17 shown in FIG. 3 is only diagrammatically indicated and for each operating control 3, a separate LED can also be provided which is arranged underneath or in overlap with the associated operating control 3.

In FIG. 4, an exploded view of the operating device 1 according to one embodiment is shown. The touchpad 2 is designed to be circular and has a total of five operating controls 3, namely an operating control 3 which is arranged in the centre of the circular touchpad 2 and also four more operating controls 3 which are arranged distributed around the central operating element 3 in the circumferential direction. To each operating control 3, a separate LED of the luminous unit 17 is allocated which is arranged on the circuit board 14. In the illustrative embodiment according to FIG. 4, the symbol bearer 18 has two different groups of symbols 25a and 25b so that in each case two different symbols 25a, 25b are allocated to each operating control 3. If the symbol bearer 18 is in the first position, the operating elements 3 are identified with the in each case allocated symbol 25a of the first group as is shown in greater detail diagrammatically by means of a top view of the operating device 1 in FIG. 5. The first position of the symbol bearer 18 is then allocated to an on-board computer as functional device of the motor vehicle so that in this position, the on-board computer can be controlled by means of the operating controls 3. As is also shown in FIG. 5, this is signalled with the aid of a function symbol BC.

If the actuating element 27 is moved into the further position in the direction of arrow 29, the identification of the operating controls 3 changes to the second group of symbols 25b. In this further position, a telephone system can be controlled, for example, which is indicated with a further function symbol 33.

Referring again to FIG. 4, the actuating element 27 can have a circumferential tooth structure 34 by means of which an actuation of the actuating element 27 is facilitated. The latching facility 32 is also designed in the form of an annular spring with knobs 35 which can latch into the said latching structure in the actuating element 27.

A top view of the touchpad 2 is shown in greater detail in FIG. 6. Each operating control 3 has a transparent window 10 through which the in each case current and associated symbol 25 can be viewed. Around the respective window 10, a capacitive sensor 12 is arranged which is formed by corresponding metallization at the rear side 6 (see FIG. 1) of the touchpad 2. As already stated, the windows 10 are formed by a recess 9 (FIG. 1) in the black printing 6.

FIG. 7 shows a top view of the symbol bearer 18 according to one illustrative embodiment. As already stated, the symbol bearer 18 can have a first group of symbols 25a and a second group of symbols 25b. The first group 25a is shown in the first position whilst the second group 25b is indicated in the further position. In the first position, the on-board computer for example is controlled; in the further position, the telephone system can be controlled, for example.

A further example of the symbol bearer 18 is shown in FIG. 8. In this case, three different angular positions are possible in which different functional devices can be controlled, namely, apart from the on-board computer and the telephone system, additionally, for example, an audio system. Function symbols 33 are provided for identifying these functional devices. In the illustrative embodiment according to FIG. 8, a total of three groups of symbols 25a, 25b, 25c are provided, the third group 25c being indicated in a third position of the symbol bearer 18 in which the audio system is controlled. The symbols 25 are only shown by way of example.

In FIGS. 9 and 10, a steering wheel 36 according to one embodiment of the invention is shown in diagrammatic and perspective representation. The steering wheel 36 has in a familiar manner a steering wheel rim 37 and a steering wheel spoke 38 which links the steering wheel rim 37 with a steering wheel hub 39. Into the steering wheel spoke 38, the operating device 1 is integrated so that the operating interface 7 faces the driver. The operator 4 can thus operate both the actuating element 27 and the operating controls 3 with a single thumb and thus control a multiplicity of functional devices of the motor vehicle.

FIG. 11 shows the operating device 1 according to a further embodiment of the invention. The actuating element 27 here has additionally an extension 40 protruding in the radial direction towards the outside and designed in the form of a radial lug via which the operator 4 can actuate the actuating element 27. The extension 40 has a trough-shaped recess 41 at which the actuating element 27 can be felt by the operator 4 and which thus simplifies the actuation of the actuating element 27.

FIG. 12 shows the steering wheel 36 with an operating device 1 according to a further embodiment of the invention. The difference here consists in that the symbol bearer 18 is not mounted rotatably but translationally displaceably, namely according to the arrow representation 42. To displace the symbol bearer 18, an actuating element 27 in the form of a slider switch can be provided. To illustrate, the various symbols 25 are identified by A, B and C in FIG. 12.

A further operating device 1 in which, in particular, the symbol bearer 18 according to FIG. 8 can be used, is shown in FIG. 13. The housing here consists of two housing parts 30a, 30b. The symbol bearer 18 rests against a holder 43 which carries the symbol bearer 18 and additionally acts as a transmission element. In this illustrative embodiment, the actuating element 27 is mounted rotatably at a rear side 44 of the housing 30 opposite the operating interface 7, namely around an axis of rotation 28a extending essentially in parallel with the operating interface 7. The actuating element 27 is here constructed to be circular and has on its outer circumference a tooth structure 45 which engages in a corresponding tooth structure 46 of the holder 43 and interacts with the latter in such a manner that when the actuating element 27 is rotated around the axis of rotation 28a, the symbol bearer 18 is rotated around an axis of rotation extending essentially perpendicularly thereto. The movement of the actuating element 27 is thus transferred to the symbol bearer 18 as conveyed by the holder 43, and thus via a transmission.

In the illustrative embodiment according to FIG. 13, the touchpad 2 is also designed to be disc-shaped and has an elongated shape. The touchpad 2 is accommodated in a receptacle or depression 47 of the housing part 30b and attached by means of a frame 48.

The latching facility 32 is here designed in the form of a spiral spring which is arranged at a latching element 49 around the latter. On the circuit board 14, conductor tracks 50 can now be seen over which the contact element 31 slides when the actuating element 27 is rotated.

A steering wheel 36 according to a further embodiment is shown in FIGS. 14 and 15. This steering wheel 36 has the operating device 1 according to FIG. 13. Whereas FIG. 14 shows a front side 51 and thus a side of the steering wheel 36 facing the driver, FIG. 15 shows a rear side 52 of the steering wheel 36 facing away from the driver. The operating device 1 is integrated in a steering wheel spoke 38 as before. The operating device 1 is arranged in such a manner that the touchpad 2 is arranged at the front side 51 of the steering wheel 36 whilst the actuating element 27 is accessible from the rear side 52. As is indicated in FIG. 15, a rotation of the actuating element 27 around its axis of rotation 28a (FIG. 13) according to the arrow representation 53 leads to a rotation of the symbol bearer 18 around an axis of rotation extending perpendicularly thereto according to the arrow representation 54. The driver can operate the actuating element 27 with his index finger or with his middle finger. The operating controls 3 at the front side 51 are preferably operated with his thumb, as before.

The invention claimed is:

1. An operating device for a motor vehicle, comprising
at least one operating control which can be actuated by an operator; and
a symbol bearer, separate from the operating control, for the graphic identification of the at least one operating control, wherein
the symbol bearer for the operating control has a first and at least one further graphical symbol different therefrom and can be moved relative to the at least one operating control between a first position in which the operating control is identified with the first symbol and at least one further position in which the operating control is identified with the further symbol,
wherein the at least one operating control is formed by a touch-sensitive switching area of a touchpad,
wherein the motor vehicle has a steering wheel where the operating device is located, and
wherein the at least one operating control is arranged at a front side of the steering wheel at a steering wheel spoke, and the operating device comprises an actuating element which can be actuated by the operator, by which the symbol bearer can be moved between the first position and the at least one further position and which is arranged at a rear side, opposite the front side, of the steering wheel.

2. The operating device according to claim 1, wherein the operating device has a multiplicity of operating controls, which can be actuated by the operator, and the symbol bearer has in each case a first and at least one further symbol different therefrom for each operating control, wherein the operating controls are identified with the respective first symbol in the first position of the symbol bearer and the operating controls are identified with the respective further symbol in the further position.

3. The operating device according to claim 1, wherein the at least one operating element is arranged in mutual overlap with the symbol bearer and has a transparent window through which the respective current symbol can be viewed.

4. The operating device according to claim 1, wherein the symbol bearer further comprises that form the graphical symbols and the operating device comprises a luminous unit for backlighting the graphical symbols.

5. The operating device according to claim 1, wherein the symbol bearer is rotatably mounted between the first position and the at least one further position.

6. The operating device according to claim 1, wherein the symbol bearer is mounted displaceably between the first position and the at least one further position, particularly displaceably in a straight line.

7. The operating device according to claim 1, wherein the operating device has an actuating element which can be actuated by the operator, by which the symbol bearer can be moved between the first position and the at least one further position.

8. The operating device according to claim 1, wherein the operating device has a control unit for detecting the current position of the symbol bearer, wherein the control unit assigns to the at least one operating control an operating function in dependence on the current position of the symbol bearer.

9. The operating device according to claim 8, wherein the control unit drives at least two mutually different functional devices of the motor vehicle by outputting corresponding control signals and to select the functional device to be driven in dependence on the current position of the symbol bearer.

10. The operating device according to claim 9, wherein the symbol bearer additionally has for each position in each case a graphical function symbol for identifying the selected functional device.

11. The operating device according to claim 1, wherein the operating device is designed for installation in and/or on a steering wheel of the motor vehicle.

12. The steering wheel according to claim 1, wherein the at least one operating control is arranged at a front side of the steering wheel, at a steering wheel spoke, and the operating device has an actuating element which can be actuated by the operator, by which actuating element the symbol bearer [can be moved between the first position and the at least one further position and which is arranged on the front side of the steering wheel.

* * * * *